United States Patent Office 3,225,122
Patented Dec. 21, 1965

3,225,122
PREVENTION OF COLD FLOW IN CIS-POLY-BUTADIENE BY ADDING HYDROGENATED DIENE POLYMER
Nelson A. Stumpe, Jr., Bartlesville, Okla., assignor to Phillips Petroleum Company, a corporation of Delaware
No Drawing. Filed Oct. 12, 1962, Ser. No. 230,272
5 Claims. (Cl. 260—894)

This invention relates to a method for preventing or substantially reducing the tendency of cis-polybutadiene to cold flow. In one aspect, it relates to a novel composition containing cis-polybutadiene and a hydrogenated polymer, in which the tendency of cis-polybutadiene to cold flow is substantially reduced.

In recent years, a great deal of research work has been conducted in the field of olefin polymerization. Great advantages have been recently made in this field as the result of the discovery of new catalyst systems. These catalyst systems are often described as being "stereospecific" since they are capable of polymerizing monomers, particularly conjugated dienes, to a certain geometric configuration. One of the products which has attracted widespread attention because of its superior properties is a polybutadiene containing a high percentage, e.g., at least 85 percent, of cis 1,4-addition. The physical properties of this high cis-polybutadiene are of such a nature that the polymer is particularly suitable for the fabrication of heavy duty tires and other articles for which conventional synthetic rubbers have heretofore been comparatively unsatisfactory. However, in the processing of high cis-polybutadiene, particularly in packaging, shipping and storage, a certain amount of difficulty has been encountered because of the tendency of the polymer to cold flow when in the unvulcanized state. For example, if cracks or punctures develop in the package used in storing the polymer, polymer will flow from the package with a resulting loss or contamination and sticking together of stacked packages.

It is an object of this invention, therefore, to provide a method for eliminating or substantially reducing the tendency of cis-polybutadiene to cold flow when in the unvulcanized state.

Another object of the invention is to provide a novel composition which contains cis-polybutadiene and a small amount of a material which prevents or substantially reduces cold flow.

Other and further objects and advantages of the invention will become apparent to those skilled in the art upon consideration of the accompanying disclosure.

The present invention is concerned with a method for treating cis-polybutadiene so as to reduce substantially its tendency to cold flow. The invention resides in the discovery that the tendency of cis-polybutadiene to cold flow can be reduced if the polymer is blended with a minor amount of a hydrogenated polymer. Broadly speaking, the method of this invention comprises the step of blending cis-polybutadiene with a minor amount of a material selected from the group consisting of hydrogenated homopolymers of 1,3-butadiene and hydrogenated copolymers of 1,3-butadiene and styrene. The amount of the hydrogenated polymer employed in the blend is usually in the range of 1 to 20 parts by weight per 100 parts by weight of the cis-polybutadiene. Any suitable method which will give an intimate blend can be used in blending the cis-polybutadiene with the hydrogenated polymer. A convenient method for preparing the composition is to blend the materials on a roll mill, in a Banbury mixer, or similar kneading device. Any suitable temperature can be employed in the mixing operation, temperatures varying from room temperature to up to 350° F. temperature being suitable. It is to be understood that the temperature employed should not be so high as to cause degradation of the polymers. The blending operation is continued for a period sufficient to obtain a homogeneous composition, e.g., for a period in the range of about 30 seconds to 10 minutes or longer. In another method for blending the materials, solutions of the polymers in a hydrocarbon solvent are thoroughly mixed, after which the composition is recovered by conventional methods, such as by steam stripping or coagulation in an alcohol.

After being treated by the method of this invention, the cis-polybutadiene can then be packaged and stored or transferred for utilization elsewhere. The polymer composition can be blended, compounded, fabricated and cured according to procedures which are well known in the rubber art. While the present invention is not dependent upon any particular reaction mechanism, it is important that the hydrogenated polymer be intimately blended with the cis-polybutadiene in order to obtain the desired reduction in cold flow.

The hydrogenated polymers employed in the practice of this invention are hydrogenated homopolymers of butadiene and copolymers of butadiene and styrene. The copolymer of butadiene and styrene preferably contains not more than 30 parts by weight of styrene per 100 parts by weight of the total monomers. Any suitable method can be employed in preparing the hydrogenated polymers, but it is preferred to use the method disclosed by R. V. Jones and C. W. Moberly in U.S. Patent No. 2,864,809. In accordance with the Jones and Moberly process, the polymer to be hydrogenated, after being freed of salts or other materials which might act as hydrogenation catalyst poisons, is charged to a hydrogenation reactor, generally as a solution or a dispersion of the polymer in a suitable solvent. A hydrogenation catalyst, such as a nickel-kieselguhr catalyst, is then added, hydrogen is introduced into the reactor, and the temperature is raised to the desired level. When the desired degree of hydrogenation has been obtained, the catalyst is removed. Additional solvent is frequently added to decrease the viscosity of the mixture and to facilitate catalyst removal, which can be accomplished by filtration, magnetic separation, or other suitable means. The solvent is finally removed, preferably in vacuo, and the product is recovered. The hydrogenated polymers employed in preparing the compositions of this invention are those which the normal unsaturation of the polymeric starting material is reduced by at least 50 percent by hydrogenation. In other words, the hydrogenated polymers have a residual unsaturation of less than 50 percent, based upon the theoretical value of 100 percent for the unhydrogenated polymer. It is preferred that the hydrogenated polymers have a degree of unsaturation in the range of 5 to 30 percent of that originally present in the unhydrogenated polymer.

The present invention is generally applicable to polybutadienes containing a high percentage of cis 1,4-addition. It is usually preferred that the cis-polybutadiene contain at least 85 percent, cis 1,4-addition, e.g., 85 to 98 percent and higher. The cis-polybutadiene can be prepared by polymerizing 1,3-butadiene with any one of a large number of different stereospecific catalyst systems. It is usually preferred to employ a catalyst which is selected from the group consisting of (1) a catalyst comprising an organometal compound having the formula $R_mM$, wherein R is an alkyl, cycloalkyl, aryl, alkaryl, aralkyl, alkylcycloalkyl, cycloalkylalkyl, arylcycloalkyl or cycloalkylaryl radical, M is aluminum, mercury, zinc, beryllium, cadmium, magnesium, sodium or potassium, and $m$ is equal to the valence of the metal M, and titanium tetraiodide, (2) a catalyst comprising an organometal compound having the formula $R_nM'$, wherein R is an organo radical as defined above, M' is aluminum, magnesium, lead, sodium or potassium, and $n$ is equal to the valence of the metal M', titanium tetrachloride and titanium tetraiodide, (3) a catalyst comprising an organometal compound having the formula $R_aM''$, wherein R is an organo radical as defined above, M'' is aluminum or magnesium and $a$ is equal to the valence of the metal M'', a compound having the formula $TiX_b$, wherein X is chlorine or bromine and $b$ is an integer from 2 to 4, inclusive, and elemental iodine, (4) a catalyst comprising an organometal compound having the formula $R_xM'''$, wherein R is an organo radical as defined above, M''' is aluminum, gallium, indium or thallium, and $x$ is equal to the valence of the metal M''', a titanium halide having the formula $TiX_4$, wherein X is chlorine or bromine, and an inorganic halide having the formula $M^{iv}I_c$, wherein $M^{iv}$ is beryllium, zinc, cadmium, aluminum, gallium, indium, thallium, silicon, germanium, tin, lead, phosphorus, antimony, arsenic and bismuth, and $c$ is an integer from 2 to 5 inclusive, and (5) a catalyst comprising an organo compound having the formula $R_xM'''$, wherein R, M''', and $x$ are defined above, titanium tetraiodide, and an inorganic halide having the formula $M^vX_d$, wherein $M^v$ is aluminum, gallium, indium thallium, germanium, tin, lead, phosphorus, arsenic or bismuth, X is chlorine or bromine, and $d$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis 1,4-polybutadiene; triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri-alpha-naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexyl)aluminum and titanium tetraiodide; tetraethyllead, titanium tetrachloride and titanium tetraiodide; trimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobutylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride and phosphorus triiodide; tri-n-dodecylaluminum, titanium tetrachloride and tin tetraiodide; triethylgallium, titanium tetrabromide and aluminum triiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

The polymerization process for preparing cis-polybutadiene is carried out of the presence of a hydrocarbon diluent which is not deleterious to the catalyst system. Examples of suitable diluents include aromatic, paraffinic, and cycloparaffinic hydrocarbons, it being understood that mixtures of these materials can also be used. Specific examples of hydrocarbon diluents, include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst used in preparing the cis-polybutadiene product can vary over a rather wide range. The amount of the organometal used in the catalyst composition is usually in the range of 0.75 to 20 mols per mol of the halogen-containing component, i.e., a metal halide with or without a second metal halide or elemental iodine. The mol ratio actually used in a polymerization will depend upon the particular components employed in the catalyst system. However, a preferred mol ratio is generally from 1:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.05:1 to 5:1. With a catalyst system comprising an organometal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from —100 to 250° F. It is usually preferred to operate at a temperature in the range of —30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

Various materials are known to be detrimental to the catalyst employed in preparing the cis-polybutadiene. These materials include carbon dioxide, oxygen and water. It is usually desirable, therefore, that the butadiene and the diluent be freed of these materials as well as other materials which may tend to inactivate the catalyst. Furthermore, it is desirable to remove air and moisture from the reaction vessel in which the polymerization is to be conducted.

Upon completion of the polymerization reaction, the reaction mixture is then treated to inactivate the catalyst and recover the rubbery polymer. A suitable method for accomplishing this result involves steam stripping the diluent from the polymer. In another suitable method, a catalyst inactivating material, such as an alcohol, is added to the mixture so as to inactivate the catalyst and cause precipitation of the polymer. The polymer is then separated from the alcohol and diluent by any suitable means, such as decantation or filtration. It has been found to be advantageous to add an antioxidant, such as 4,4'-methylene-bis-(2,6-di-tert-butylphenol), to the polymer solution prior to recovery of the polymer. The polymer which has been recovered by these methods is then treated in accordance with the present invention so as to reduce the tendency of the polymer to cold flow.

A more comprehensive understanding of the invention may be obtained by referring to the following illustrative examples, which are not intended, however, to be unduly limitative of the invention.

EXAMPLE I

A series of runs was carried out in which varying amount of hydrogenated polybutadiene was blended with cis-polybutadiene on a cold roll mill. The blending operations took from about 2 to 3 minutes, and homogeneous mixtures were obtained in all cases. The resulting blends were tested in order to determine their tendency to cold flow. The results of these tests are shown below in Table I.

The cis-polybutadiene used in preparing the blends contained 94.9 percent cis 1,4-addition, 2.0 percent trans 1,4-addition, and 3.1 percent 1,2-addition. The polymer was prepared by polymerizing 1,3-butadiene with a catalyst obtained by mixing triisobutylaluminum, titanium tetrachloride and free iodine. The hydrogenated polybutadienes were prepared by hydrogenating an emulsion polybutadiene in methylcyclohexane, using a nickel-kieselguhr catalyst.

*Table I*

| Blend No. | 1 | 2 | 3 | 4 | 5 | 6 |
|---|---|---|---|---|---|---|
| cis-Polybutadiene | 100 | 100 | 100 | 100 | 100 | 100 |
| Hydrogenated polybutadiene [a] | | 5 | 10 | 15 | | |
| Hydrogenated polybutadiene [b] | | | | | 5 | 10 |
| Cold flow [c] | 4.45 | 2.20 | 1.85 | 1.35 | 2.11 | 1.40 |

[a] 17% unsaturation.
[b] 8% unsaturation.
[c] Cold-Flow—Glass Plate Method. Method is based on the change in contact area of four right circular cylinders of rubber compressed between two glass plates. The cold flow rating is the ratio of the final contact area to the original contact area. Four pellets, approximately 0.450 inch in diameter and the same in height, are measured with a hand micrometer and recorded as thousandths of an inch. The average diameter is obtained and squared. Glass plates 3" x 4" weighing an average of 26-27 grams, which have been cleaned and polished with silicone lens tissue, are used for the test. Four rubber pellets are positioned at the corners of a 1.5" x 2" rectangle within the glass plate. Another glass plate is positioned over the top of the pellets such that it is directly over the bottom plate and a 160 gram 3" x 4" lead plate is placed on top. The assembly is allowed to stand 18 hours at 80° F. after which the lead weight is removed and the contact area observed through the glass plate. Measurement is first taken across the longest dimension of the contact area and a second measurement taken at right angles to the first one. The eight measurements (two for each pellet) are recorded and averaged to obtain a final average diameter. The value is squared and divided by the initial average diameter squared to obtain the cold flow.

The data in Table I show that the tendency of the cis-polybutadiene to cold flow was substantially reduced by blending therewith small amounts of hydrogenated polybutadiene.

EXAMPLE II

Runs were conducted in which blends No. 3 and 6 of Example I were compounded and cured and certain physical properties determined. A control run was also carried out in which the cis-polybutadiene was similarly treated. The data obtained in these runs is shown below in Table II.

*Table II*

EVALUATION OF CIS-POLYBUTADIENE RUBBER CONTAINING HYDROGENATED POLYBUTADIENE

| | A | B | C |
|---|---|---|---|
| cis-Polybutadiene | 100 | 100 | 100 |
| Hydrogenated polybutadiene, 17% unsaturation | 10 | | |
| Hydrogenated polybutadiene, 8% unsaturation | | 10 | |
| Carbon black | 50 | 50 | 50 |
| Zinc oxide | 3 | 3 | 3 |
| Stearic acid | 2 | 2 | 2 |
| Philrmin 5 [a] | 10 | 10 | 10 |
| Flexamine [b] | 1 | 1 | 1 |
| Sulfur | 1.75 | 1.75 | 1.75 |
| NOBS Special [c] | 1.05 | 1.05 | 1.05 |

PROCESSING DATA

| | A | B | C |
|---|---|---|---|
| Mooney (MS 1½ at 212° F.) [1] | 41 | 41 | 44 |
| Extrusion at 250° F. [2]: | | | |
| in./min | 42.5 | 34 | 45.3 |
| g./min | 114 | 95 | 122.5 |
| Rating (Garvey die) | 6− | 7 | 7 |

PHYSICAL PROPERTIES (30 MIN. CURE AT 307° F.)

| | A | B | C |
|---|---|---|---|
| $\nu \times 10^4$, moles/cc. [3] | 1.59 | 1.59 | 1.81 |
| 300% modulus, p.s.i. [4] | 840 | 855 | 905 |
| Tensile, p.s.i. [4] | 2550 | 2575 | 2540 |
| Elongation, percent [4] | 590 | 610 | 580 |
| Resilience, percent [5] | 74.5 | 73.9 | 73.3 |
| Heat build up, $\Delta T$, °F. [6] | 49.7 | 50.7 | 45.9 |
| Shore A hardness [7] | 60 | 60.5 | 58 |

[a] Aromatic oil.
[b] Physical mixture of complex diarylamine-ketone reaction product (65%) and N,N'-diphenyl-p-phenylenediamine (35%).
[c] N-oxydiethylene-2-benzothiazyl sulfinamide.
[1] ASTM D297–55T.
[2] Extrusion is carried out at 250° F. by essentially the same procedure as described by Garvey et al., Ind. & Eng. Chem. 34, 1309 (1942). As regards the rating figure, 12 designates an extruded product considered to be perfectly formed whereas lower numerals indicate less perfect products.
[3] Determined by the Swelling Method of Kraus, as described in Rubber World 135, 67–73, 254–260 (1956).
[4] ASTM D412–51T. Scott Tensile Machine L–6. Tests made at 80° F.
[5] ASTM D945–55 (modified). Yerzley oscillograph. Test specimen is a right circular cylinder 0.7 inch in diameter and 1 inch high.
[6] ASTM D623–52T. Method A, Goodrich Flexometer, 143 lbs./sq. inch load, 0.175 inch stroke. Test specimen is a right circular cylinder 0.7 inch in diameter and 1 inch high.
[7] ASTM D676–55T. Shore Durometer, Type A.

The data in Table II demonstrate that the physical properties of the parent cis-polybutadiene are unimpaired by incorporation of the hydrogenated polybutadienes.

The composition of this invention is suitable for all uses for which cis-polybutadiene per se can be employed. It is particularly useful in the manufacture of tire treads, tire carcass stocks, and other rubbery articles. It can be extruded, reinforced with conventional reinforcing agents, blended with other polymers, such as natural and synthetic rubbers, extended with conventional extender oils, and vulcanized using recipes that are well known in the rubber art.

As will be evident to those skilled in the art, many variations and modifications of the invention can be practiced in view of the foregoing disclosure. Such variations and modifications are believed to come within the spirit and scope of the invention.

I claim:

1. A rubbery, unvulcanized composition of matter comprising a blend of (1) a major amount of cis-polybutadiene containing at least 85 percent cis-1,4 addition, and (2) a minor amount of a material selected from the group consisting of a hydrogenated homopolymer of 1,3-butadiene and a hydrogenated copolymer of 1,3-butadiene and styrene, in which the residual unsaturation of said hydrogenated polymer is less than 50 percent of that originally present in the unsaturated polymer.

2. A rubbery, unvulcanized composition of matter comprising a blend of (1) a cis-polybutadiene containing at least 85 percent cis 1,4-addition, and (2) from 1 to 20 parts by weight per 100 parts by weight of said cis-polybutadiene of a hydrogenated polymer selected from the group consisting of a hydrogenated homopolymer of 1,3-butadiene and a hydrogenated copolymer of 1,3-butadiene and styrene, in which the residual unsaturation of said hydrogenated polymer is less than 50 percent of that originally present in the unsaturated polymer.

3. The composition of claim 2 in which said hydrogenated polymer has a degree of unsaturation in the range of 5 to 30 percent of that originally present in the unhydrogenated polymer.

4. A method for reducing the tendency of a cis-polybutadiene to cold flow when in the unvulcanized state which comprises blending a cis-polybutadiene containing at least 85 percent cis 1,4-addition with from 1 to 20 parts by weight per 100 parts by weight of said cis-polybutadiene of a hydrogenated polymer selected from the group consisting of a hydrogenated polymer of 1,3-butadiene and a hydrogenated copolymer of 1,3-butadiene and styrene, said hydrogenated polymers being solid and containing a residual unsaturation of less than 50 percent of the saturation originally present in the unhydrogenated polymer, said blending occurring at a temperature varying from room temperature to 350° F. for a time sufficient to obtain a homogeneous composition.

5. The method of claim 4 in which said hydrogenated polymer has a degree of unsaturation in the range of 5 to 30 percent of that originally present in the unhydrogenated polymer.

References Cited by the Examiner

UNITED STATES PATENTS

| | | | |
|---|---|---|---|
| 2,730,515 | 1/1956 | McCracken et al. | 260—80.7 |
| 2,834,751 | 5/1958 | Jones | 260—889 |
| 2,864,809 | 12/1958 | Jones et al. | 260—94.7 |
| 3,060,989 | 10/1962 | Railsback et al. | 260—894 |

FOREIGN PATENTS 144,858   1/1952   Australia.

MURRAY TILLMAN, *Primary Examiner.*

WILLIAM H. SHORT, *Examiner.*